(12) United States Patent
Ishizuka

(10) Patent No.: US 9,742,989 B2
(45) Date of Patent: Aug. 22, 2017

(54) IMAGING DEVICE, IMAGING METHOD AND STORAGE MEDIUM FOR CONTROLLING EXECUTION OF IMAGING

(71) Applicant: NEC Corporation, Minato-ku, Tokyo (JP)

(72) Inventor: Yukari Ishizuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/768,328

(22) PCT Filed: Feb. 6, 2014

(86) PCT No.: PCT/JP2014/052728
§ 371 (c)(1),
(2) Date: Aug. 17, 2015

(87) PCT Pub. No.: WO2014/136521
PCT Pub. Date: Sep. 12, 2014

(65) Prior Publication Data
US 2015/0365590 A1 Dec. 17, 2015

(30) Foreign Application Priority Data
Mar. 6, 2013 (JP) ................. 2013-043821

(51) Int. Cl.
*H04N 5/222* (2006.01)
*H04N 5/232* (2006.01)
(Continued)

(52) U.S. Cl.
CPC ........... *H04N 5/23219* (2013.01); *G03B 9/64* (2013.01); *G03B 17/02* (2013.01); *G06F 3/01* (2013.01);
(Continued)

(58) Field of Classification Search
CPC ............. H04N 5/23293; H04N 5/2252; H04N 1/00411; G03B 2217/002; G02B 13/001
(Continued)

(56) References Cited

U.S. PATENT DOCUMENTS

| 7,046,287 B2* | 5/2006 | Nishino | .............. | H04M 1/0216 |
| | | | | 348/333.06 |
| 2004/0130658 A1* | 7/2004 | Yamaguchi | ........... | G06F 1/1616 |
| | | | | 348/375 |

(Continued)

FOREIGN PATENT DOCUMENTS

| CN | 101742114 A | 6/2010 |
| JP | 2004187182 A | 7/2004 |

(Continued)

OTHER PUBLICATIONS

International Search Report for PCT Application No. PCT/JP2014/052728, mailed on Mar. 4, 2014.
(Continued)

*Primary Examiner* — Kelly L Jerabek

(57) ABSTRACT

An imaging device includes an imaging unit that is provided at a case body and images an object; an operation input unit utilized to input an imaging operation; a first instruction unit that instructs the imaging unit to execute the imaging when the imaging operation is input; a second instruction unit that instructs, based on a trigger other than the imaging operation, the imaging unit to execute the imaging; and a control unit that performs, based on a state of the case body, a control to invalidate any one of the instruction by the first instruction unit and the instruction by the second instruction unit.

12 Claims, 15 Drawing Sheets

(51) Int. Cl.
*G03B 9/64* (2006.01)
*G03B 17/02* (2006.01)
*G06F 3/01* (2006.01)
*H04N 5/14* (2006.01)
*H04N 5/225* (2006.01)

(52) U.S. Cl.
CPC ............ *G06F 3/017* (2013.01); *H04N 5/144* (2013.01); *H04N 5/2252* (2013.01); *H04N 5/232* (2013.01); *H04N 5/23222* (2013.01); *H04N 5/23245* (2013.01)

(58) Field of Classification Search
USPC .......... 348/333.01, 333.05, 333.11, 373, 376
See application file for complete search history.

(56) References Cited

U.S. PATENT DOCUMENTS

| | | | |
|---|---|---|---|
| 2005/0134717 A1 | 6/2005 | Misawa | |
| 2007/0070184 A1* | 3/2007 | Kim | G06F 1/1605 348/14.02 |
| 2008/0285791 A1 | 11/2008 | Suzuki et al. | |
| 2009/0278764 A1 | 11/2009 | Kuwahara et al. | |
| 2010/0208123 A1* | 8/2010 | Akagi | H04N 5/2628 348/333.12 |
| 2010/0302393 A1 | 12/2010 | Olsson et al. | |

FOREIGN PATENT DOCUMENTS

| | | |
|---|---|---|
| JP | 2004336514 A | 11/2004 |
| JP | 2008283502 A | 11/2008 |
| JP | 2010022022 A | 1/2010 |
| JP | 2010074735 A | 4/2010 |
| JP | 2010153954 A | 7/2010 |
| JP | 2010273280 A | 12/2010 |
| JP | 2011118725 A | 6/2011 |
| JP | 2012115519 A | 6/2012 |
| WO | 2012/111793 A1 | 8/2012 |

OTHER PUBLICATIONS

Extended European Search Report for EP Application No. EP14759623.3 dated on Sep. 27, 2016.

* cited by examiner

IMAGING DEVICE, IMAGING METHOD AND STORAGE MEDIUM FOR CONTROLLING EXECUTION OF IMAGING

This application is a National Stage Entry of PCT/JP2014/052728 filed on Feb. 6, 2014, which claims priority from Japanese Patent Application 2013-043821 filed on Mar. 6, 2013, the contents of all of which are incorporated herein by reference, in their entirety.

TECHNICAL FIELD

The present invention relates to an imaging device, an imaging method, and a corresponding program.

BACKGROUND ART

Foldable portable imaging devices, such as cellular phones with camera or portable information terminals with camera, have spread through the market.

Various technologies related to such a background are known (see, for example, Patent Document 1).

For example, Patent Document 1 discloses a foldable portable imaging device that has an optical system utilized to image an object (or subject) and employs a foldable structure in which a key operation main body and a display main body are joined together via a hinge.

More specifically, when the above foldable portable imaging device is held to form an opening and closing angle within a predetermined range between the key operation main body and the display main body which are relatively rotated to each other, an imaging mode of a relevant imaging unit is automatically set to a self-timer mode. Accordingly, self-timer photographing utilizing this foldable portable imaging device can be performed by only holding it to form the opening and closing angle within the predetermined range between the key operation main body and the display main body, and thereby it is possible to omit an operation to select a self-timer mode by using a mode menu of the foldable portable imaging device on each relevant occasion.

In recent years, a digital camera that detects a smiling face and performs a release operation (to perform photographing without pressing the shutter button) has become popular.

Various technologies related to such a background are known (see, for example, Patent Document 2).

As an example, Patent Document 2 discloses an imaging apparatus such as a digital camera capable of capturing still images and videos.

More specifically, data of the face area of a target object, extracted feature points, and set trigger information are obtained. The imaging apparatus has a control unit to detect, based on the obtained information, a facial expression or gesture of the object as a trigger for the release operation from a through image (i.e., an image before pressing the shutter) in a buffer memory. If the imaging apparatus performs photographing in an advanced face mode, the photographing is automatically executed when a facial expression or gesture of the object as the trigger for the release operation is detected from the through image.

Therefore, this imaging apparatus can easily capture a facial expression or gesture of the object, which matches a photographing scene or a photographing mode without effort.

In addition, an information processing device such as a personal computer, a cellular phone, or a television receiver is formed by a display unit, that may be a liquid crystal display, and an input unit that may be a keyboard, buttons, a remote controller, a mouse, or a touch panel for inputting a predetermined operation content or characters.

Various technologies related to such a background are known (see, for example, Patent Document 3).

For example, Patent Document 3 discloses an information processing method performed by utilizing an information processing device that is operable by gesture.

More specifically, an mirror image processing unit is employed to trim an external shape of an image of a gesture target whose shape has been determined, so as to subject the image of the gesture target to a mirror image processing. Then a gesture display control unit displays the gesture target to which the mirror image processing has been applied.

Therefore, according to the imaging device of this method, it is possible to know a gesture starting position of the gesture target with respect to the camera position. Accordingly, the user can learn how to operate the gesture function so as to execute a desired command. In addition, when the gesture function is actually performed by using this imaging device, a corresponding locus is drawn. Therefore, the user can complete the input of the desired command while confirming the gesture accepting status of the apparatus. As a result, this imaging device can remove the user's anxiety for the gesture input.

PRIOR ART DOCUMENT

Patent Document

Patent Document 1: Japanese Unexamined Patent Application, First Publication No. 2004-336514.
Patent Document 2: Japanese Unexamined Patent Application, First Publication No. 2010-273280.
Patent Document 3: Japanese Unexamined Patent Application, First Publication No. 2011-118725.

DISCLOSURE OF INVENTION

Problem to be Solved by the Invention

According to the technique described in Patent Document 1, the self-timer mode is selected only when the opening and closing angle of the second body to the first body is between 45 and 135 degrees, so as to prevent photographing mistake. However, the technique described in Patent Document 1 cannot perform photographing when a facial expression or gesture of an object in accordance with a photographing scene or mode is detected.

According to the technique described in Patent Document 2, it is possible to obtain an effect such that photographing can be performed even when the object is away from the imaging device. However, photographing is also executed when the object unintentionally performs a motion similar to a predetermined gesture. Therefore, in the technology described in Patent Document 2, whether or not to use a given gesture function for the object is switched by a user operation, and thus the operation is complicated.

According to the technique described in Patent Document 3, although the anxiety of the user for the gesture input can be removed, whether or not to use a given gesture function for the object is switched by a user operation, and thus the operation is complicated.

An object of the present invention is to provide an imaging device, an imaging method, and a corresponding program, which can solve the above problem.

Means for Solving the Problem

In order to solve the above problem, the present invention provides an imaging device comprising:
a case body;
an imaging unit that is provided at the case body and images an object;
an operation input unit utilized to input an imaging operation;
a first instruction unit that instructs the imaging unit to execute the imaging when the imaging operation is input via the operation input unit;
a second instruction unit that instructs, based on a trigger other than the imaging operation, the imaging unit to execute the imaging; and
a control unit that performs, based on a state of the case body, a control to invalidate any one of the instruction by the first instruction unit and the instruction by the second instruction unit.

The present invention also provides an imaging method comprising:
a first instruction step that instructs an imaging unit to execute imaging when an imaging operation is input via an operation input unit;
a second instruction step that instructs, based on a trigger other than the imaging operation, the imaging unit to execute the imaging; and
a control step that performs, based on a state of a case body, a control to invalidate any one of the instruction by the first instruction step and the instruction by the second instruction step.

The present invention also provides a program utilized to make a computer function as:
a first instruction unit that instructs an imaging unit to execute imaging when an imaging operation is input via an operation input unit;
a second instruction unit that instructs, based on a trigger other than the imaging operation, the imaging unit to execute the imaging; and
a control unit that performs, based on a state of a case body, a control to invalidate any one of the instruction by the first instruction unit and the instruction by the second instruction unit.

The above disclosure of the invention does not include all features according to the present invention. Additionally, a sub-combination among the features also functions as the present invention.

Effect of the Invention

As apparent from the above description, in accordance with the present invention, it is possible to prevent a complex operation of the user and perform an appropriate control.

MODE FOR CARRYING OUT THE INVENTION

Below, the present invention will be explained by utilizing embodiments. However, the embodiments do not limit the scope of the claimed invention, and each combination of the features explained in the embodiments is not always essential as means for solving the problem targeted by the invention.

Figure 1:
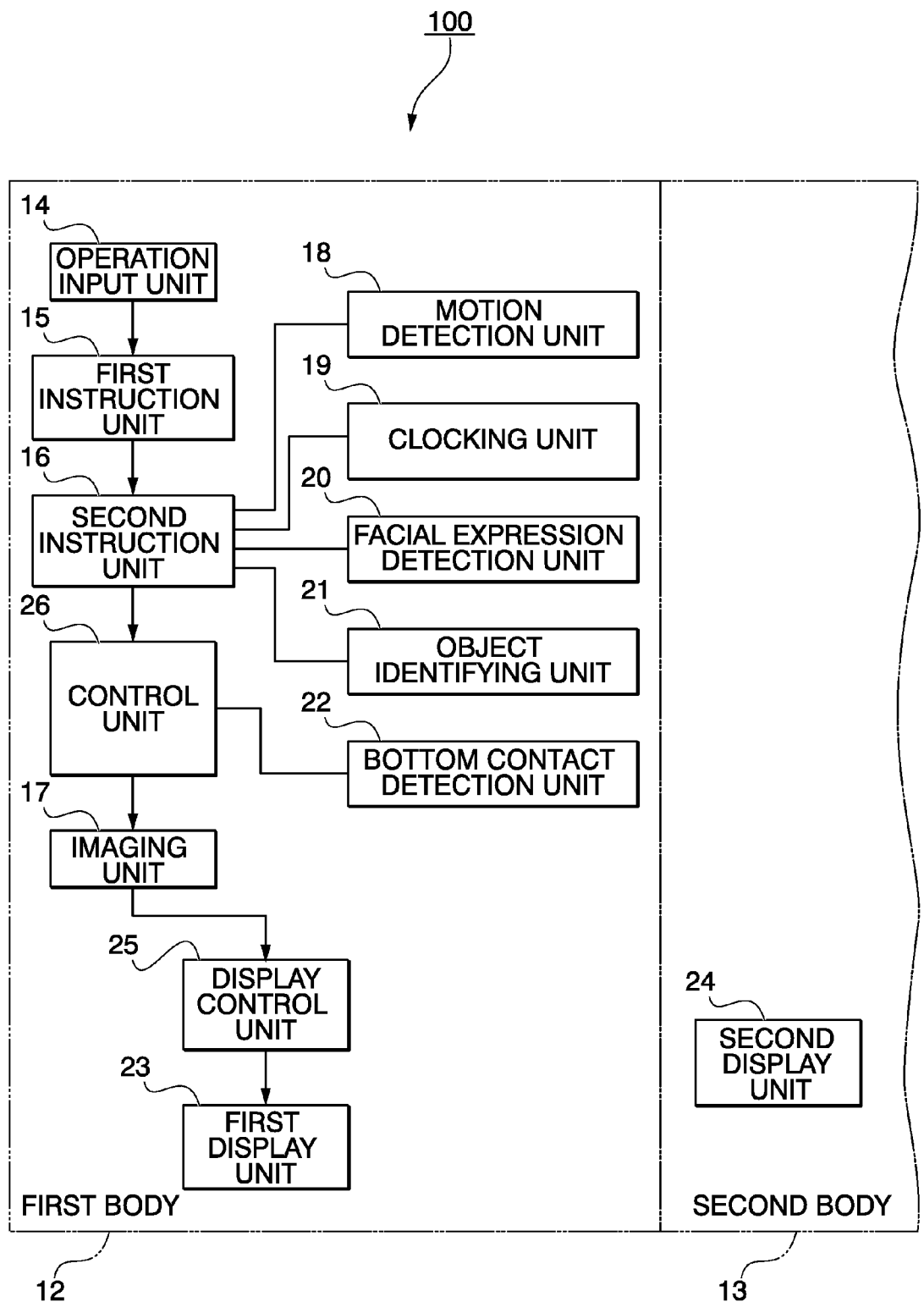
FIG. 1 is a diagram showing an example of the block configuration of a smartphone 100 according to one embodiment of the present invention.

FIG. 1 shows an example of the block configuration of a smartphone 100 according to one embodiment of the present invention. Here, the smartphone 100 is a cellular phone having a function as a portable personal computer. In addition, the smartphone 100 is an example of the image device in the present invention.

The smartphone 100 has a first body 12, second body 13, an operation input unit 14, a first instruction unit 15, a second instruction unit 16, an imaging unit 17, a motion detection unit 18, a clocking unit 19, a facial expression detection unit 20, an object identifying unit 21, a bottom contact detection unit 22, a first display unit 23, a second display unit 24, a display control unit 25, and a control unit 26.

The first body 12 includes the first display unit 23. The second body 13 is openable and closable with respect to the first body 12 and includes the second display unit 24.

The first display unit 23 and the second display unit 24 are respectively provided on the outer surfaces of the first body 12 and the second body 13 in their closed state.

The operation input unit 14 is arranged on the first display unit 23 and inputs a user operation into the smartphone 100.

When an imaging operation is input (by the user) via the operation input unit 14, the first instruction unit 15 commands the imaging unit 17 to execute the imaging.

The second instruction unit 16 commands the imaging unit 17 to execute the imaging based on a trigger other than the above imaging operation.

More specifically, when a predetermined motion of the object is detected by the motion detection unit 18, the second instruction unit 16 commands the imaging unit 17 to execute the imaging. In addition, when a predetermined time has elapsed by means of the clocking unit 19, the second instruction unit 16 commands the imaging unit 17 to execute the imaging. Additionally, when a predetermined facial expression of the object is detected by the facial expression detection unit 20, the second instruction unit 16 commands the imaging unit 17 to execute the imaging. Furthermore, when a predetermined object is identified by the object identifying unit 21, the second instruction unit 16 commands the imaging unit 17 to execute the imaging.

The imaging unit 17 is provided on one of the outer surfaces of the first body 12 and the second body 13 in their closed state, and also on one of the inner surfaces in this closed state.

The motion detection unit 18 detects the motion of the object.

The clocking unit 19 is a timer utilized to measure the elapsed time.

The facial expression detection unit 20 detects the facial expression of the object.

The object identifying unit 21 identifies the object.

The bottom contact detection unit 22 detects a bottom contact state of the smartphone 100.

The display control unit 25 performs a control to display each image captured by the imaging unit 17 on the first display unit 23 or the second display unit 24.

Specifically, when an operation to designate the first display unit 23 or the second display unit 24 as a target display is input via the operation input unit 14, the display control unit 25 performs a switching control between the first display unit 23 and the second display unit 24 so as to display each image captured by the imaging unit 17.

The display control unit 25 also performs a control to display the image captured by the imaging unit 17 as an mirror image on the first display unit 23 or the second display unit 24

Based on the open or closed state of the first body 12 and the second body 13, the control unit 26 performs a control to invalidate (or suppress) any one of the instruction from the first instructing unit 15 and the instruction from the second instructing unit 16.

Specifically, when the first body 12 and second body 13 form an open state at a predetermined angle (refer to FIG. 4 which will be explained later), the control unit 26 performs a control to validate (i.e., not suppress) the instruction from the second instructing unit 16.

In addition, while the first body 12 and second body 13 form the open state at the predetermined angle, if a predetermined bottom contact state for the first body 12 and second body 13 is detected by the bottom contact detection unit 22, the control unit 26 performs the control to validate the instruction from the second instructing unit 16.

Additionally, when the first body 12 and second body 13 form the closed state, the control unit 26 performs a control to invalidate the instruction from the second instructing unit 16.

Furthermore, when the control unit 26 performs the control to validate the instruction from the second instructing unit 16 according to an instruction by means of the user input or the like, the control unit 26 performs a control to invalidate the instruction from the first instructing unit 15.

Figure 2:
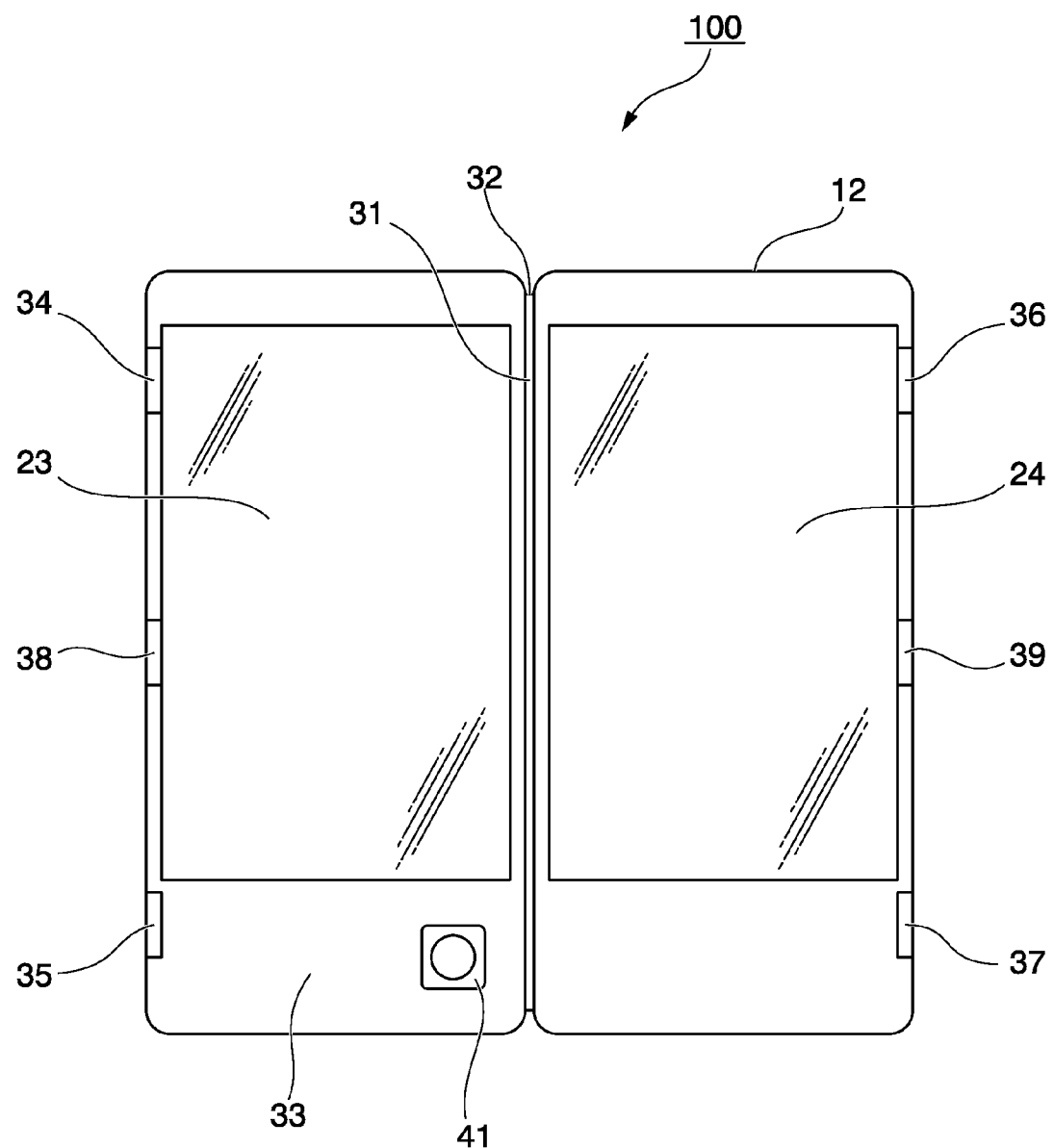
FIG. 2 is a plan view of the smartphone 100.
Figure 3:
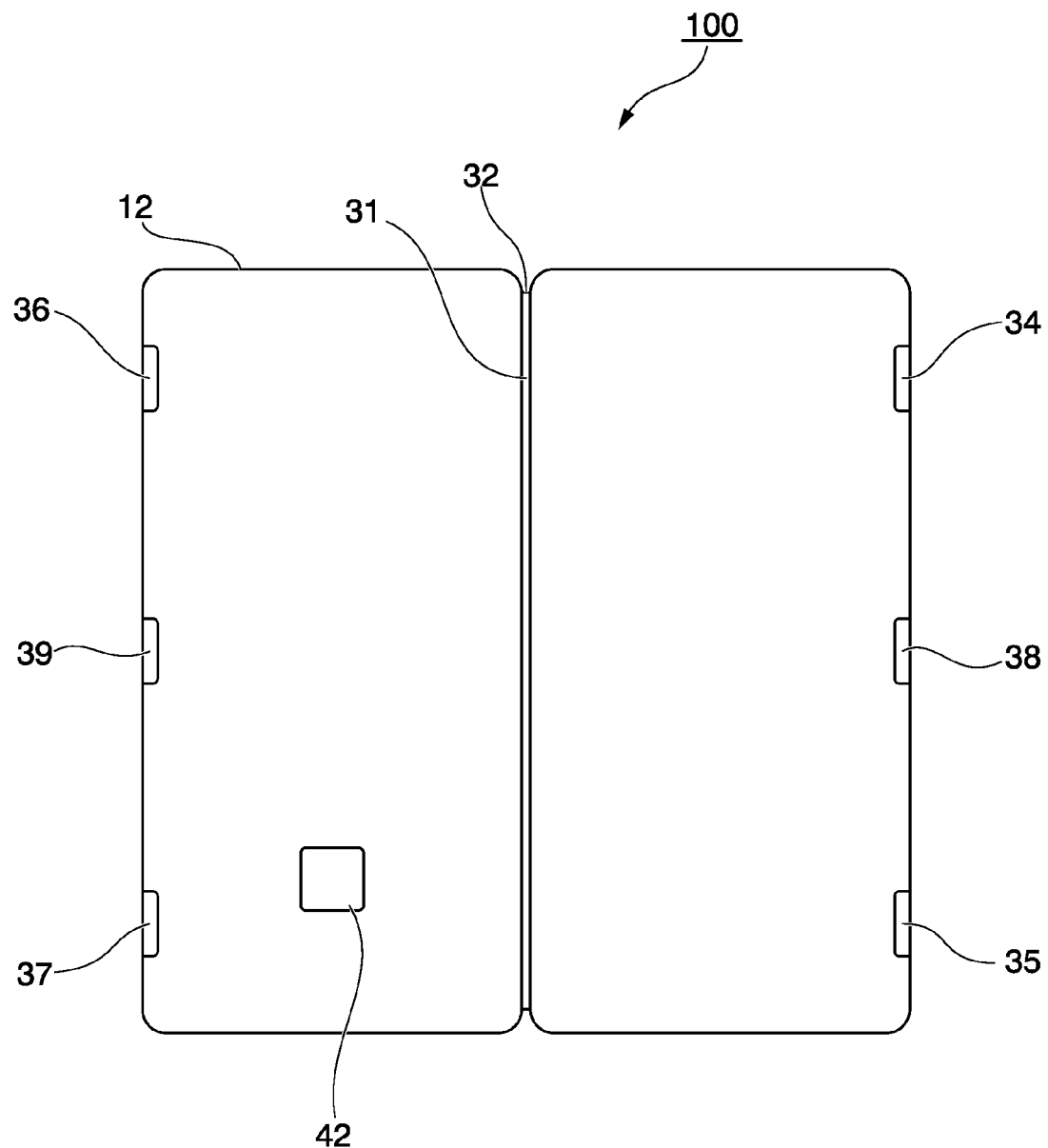
FIG. 3 is a bottom view of the smartphone 100.
Figure 4:
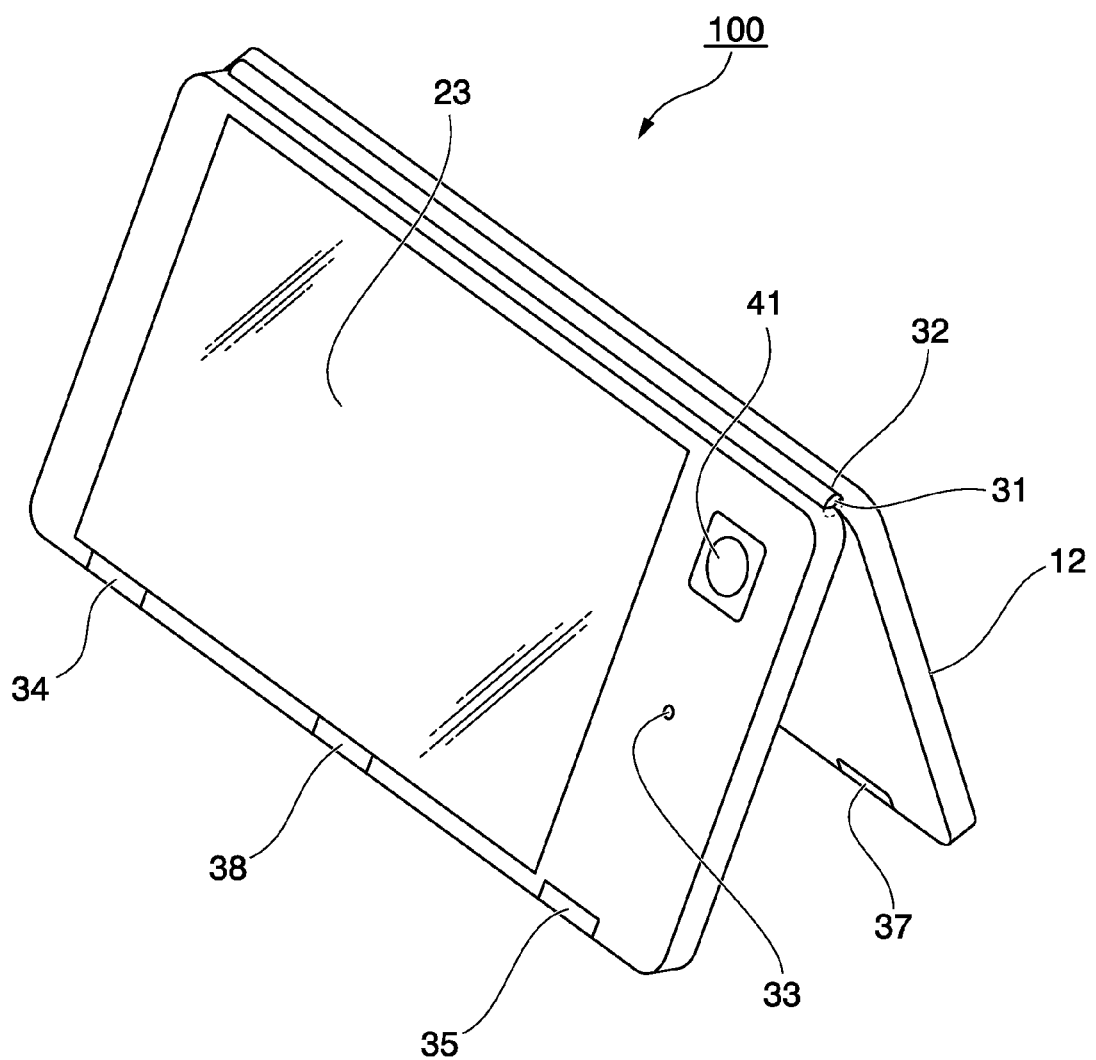
FIG. 4 is an external perspective view of a use state of the smart phone 100.

FIG. 2 is a plan view of the smartphone 100. FIG. 3 is a bottom view of the smartphone 100. FIG. 4 is an external perspective view of a use state of the smart phone 100.

As shown in FIGS. 2 and 3, in the smartphone 100, a hinge member 31 is provided between the inner surface of the longer sides of the first body 12 and the inner surface of the longer sides of the second body 13. Therefore, the first body 12 and second body 13 are rotatable around their longitudinal direction as an axis.

The hinge member 31 includes an angle sensor 32. The angle sensor 32 is utilized to detect whether the first body 12 and second body 13 are open, and if open, whether they are open to form a predetermined angle, or whether they are closed. The angle sensor 32 outputs a relevant electric signal to the control unit 26.

Instead of the angle sensor 32, a distance sensor provided at the two bodies 12 and 13 may be employed to measure the angle between the two bodies 12 and 13. The angle measurement between the two bodies 12 and 13 may be performed by any method, for example, a plurality of protrusions and recesses may be formed at the two bodies 12 and 13.

In the first body 12, a first camera 41 as the imaging unit 17 of the present embodiment is mounted in the vicinity of the first display unit 23. Additionally, in the first body 12, a microphone 33 is mounted in the vicinity of the first camera 41. Furthermore, in the first body 12, a first bottom contact sensor 34 and a second bottom contact sensor 35, which function as the bottom contact detection unit 22 pertaining to the present invention, are provided at the outer surface of the longer sides in a manner such that they are spaced away from each other.

In the second body 13, a second camera 42 as the imaging unit 17 of the present embodiment is attached to the back side of the second display unit 24. Additionally, in the second body 13, a third bottom contact sensor 36 and a fourth bottom contact sensor 37, which also function as the bottom contact detection unit 22 pertaining to the present invention, are provided at the outer surface of the longer sides in a manner such that they are spaced away from each other.

The four bottom contact sensors 34, 35, 36, and 37 are pressure sensors. When at least two (i.e., two points) of them provided at the body 12 or 13 contact a desk or the like, it is detected that the smartphone 100 is placed on something. In contrast, when the four bottom contact sensors 34, 35, 36, and 37 do not contact a desk or the like, it is not detected that the smartphone 100 is placed on something. The bottom contact sensors 34, 35, 36, and 37 each output a detected electric signal to the control unit 26.

Instead of the bottom contact sensors, an acceleration sensor utilized to determine a posture may be employed to detect whether or not the smartphone contacts a desk or the like. Such an acceleration sensor may be combined with two bottom contact sensors.

Alternatively, as means for detecting whether or not the smartphone contacts a desk or the like, strip-shaped pressure sensors may be arranged along the relevant two of the longer sides of the bodies 12 and 13 so as to detect a pressure onto a predetermined area, by which the bottom contact state is determined. Further alternatively, as means for detecting whether or not the smartphone contacts a desk or the like, when a combination of pressures onto predetermined portions is detected by using pressure sensors, the bottom contact state is determined. Therefore, any detection method may be employed.

In the first body 12, a first magnetic sensor 38 is attached to the outer surface of the longer sides, and typically, to the center part of the outer surface. In the second body 13, a second magnetic sensor 39 is attached to the outer surface of the longer sides, and specifically to the center part of the outer surface in a manner such that the second magnetic sensor 39 is opposed to the first magnetic sensor 38.

The two magnetic sensors 38 and 39 are utilized to detect the opening and closing state of the two bodies 12 and 13. Specifically, when the two magnetic sensors 38 and 39 detect a predetermined magnetic force, they identify the closed state and output a corresponding electric signal to the control unit 26. In contrast, when the two magnetic sensors 38 and 39 do not detect the predetermined magnetic force, they identify the open state and output a corresponding electric signal to the control unit 26.

The above two magnetic sensors 38 and 39 are not essential and perform an auxiliary function for the angle sensor 32.

As shown in FIG. 4, the smartphone 100 may be used in a form in which the second body 13 is opened from the first body 12 to have a predetermined angle therebetween, where the smartphone 100 is placed on a surface of a desk or the like in this open state.

In this case, the angle sensor 32 detects the relevant open state at the predetermined angle of the two bodies 12 and 13, and the electric signal for the open state is supplied to the controller 26. Since the four bottom contact sensors 34, 35, 36, and 37 each contact the desk or the like, the electric signal which indicates the bottom contact state is supplied to the control unit 26.

Figure 5:
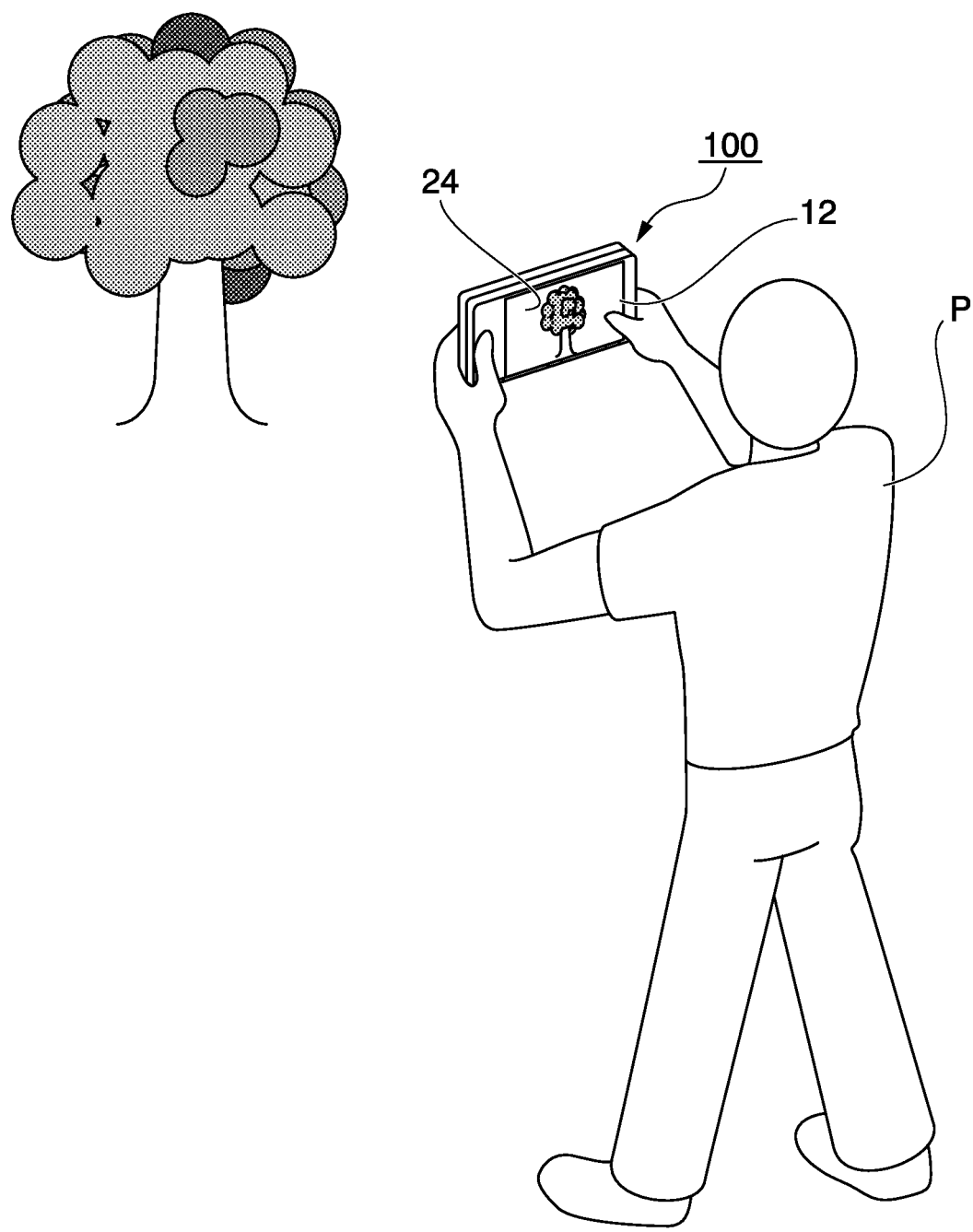
FIG. 5 is a diagram showing an example of a first image capturing method according to the smartphone 100.
Figure 6:
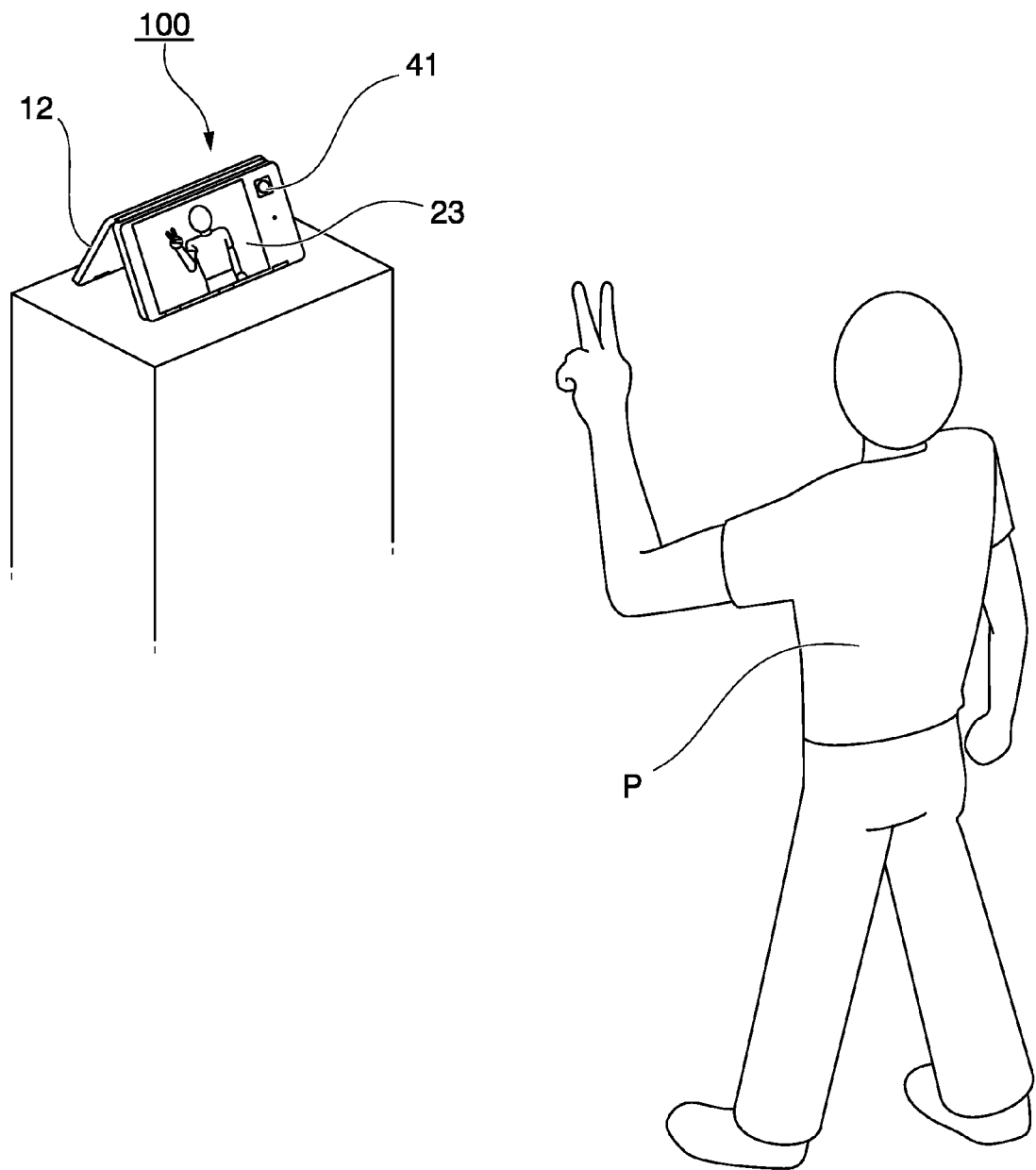
FIG. 6 is a diagram showing an example of a second image capturing method according to the smartphone 100.
Figure 7:
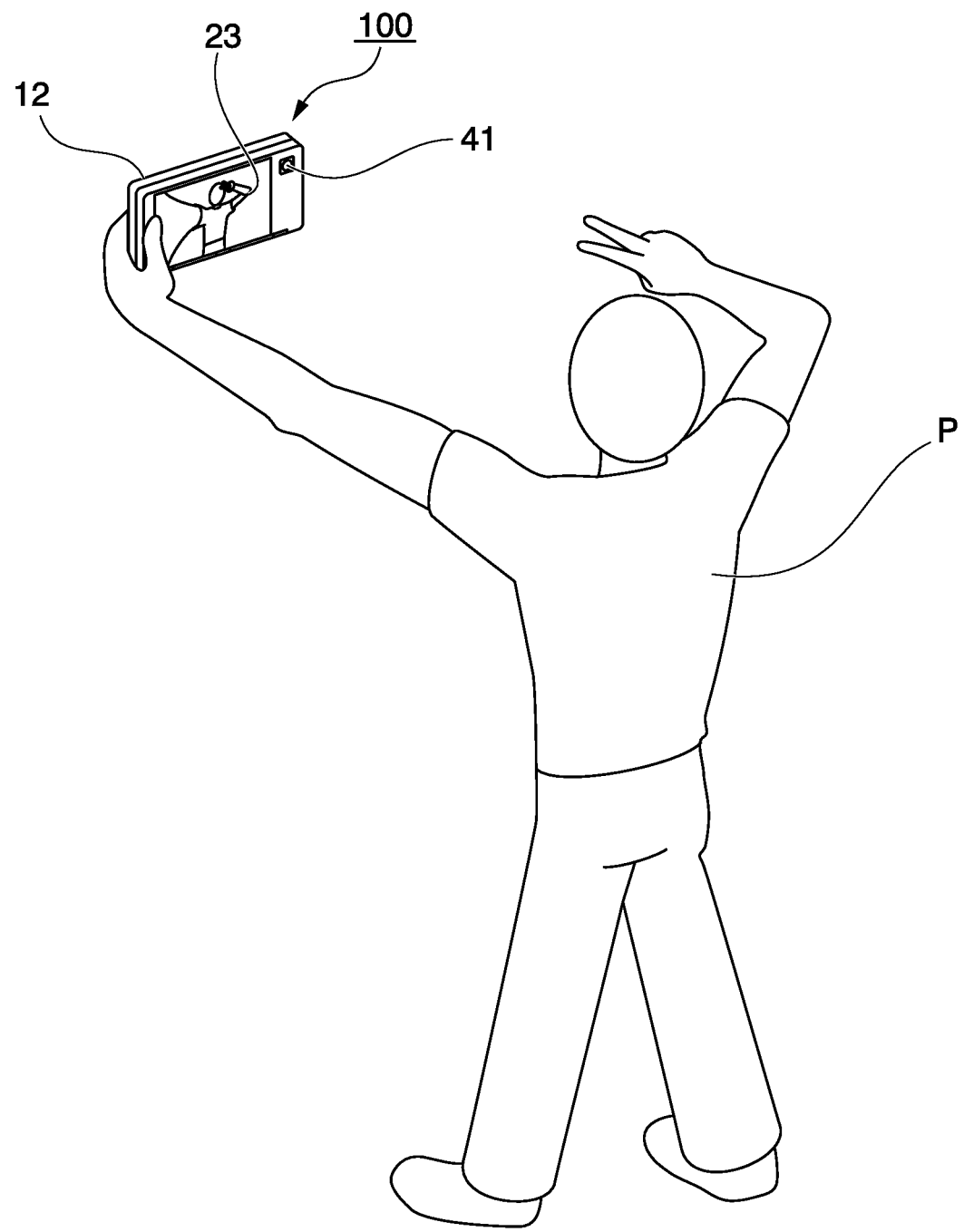
FIG. 7 is a diagram showing an example of a third image capturing method according to the smartphone 100.
Figure 8:
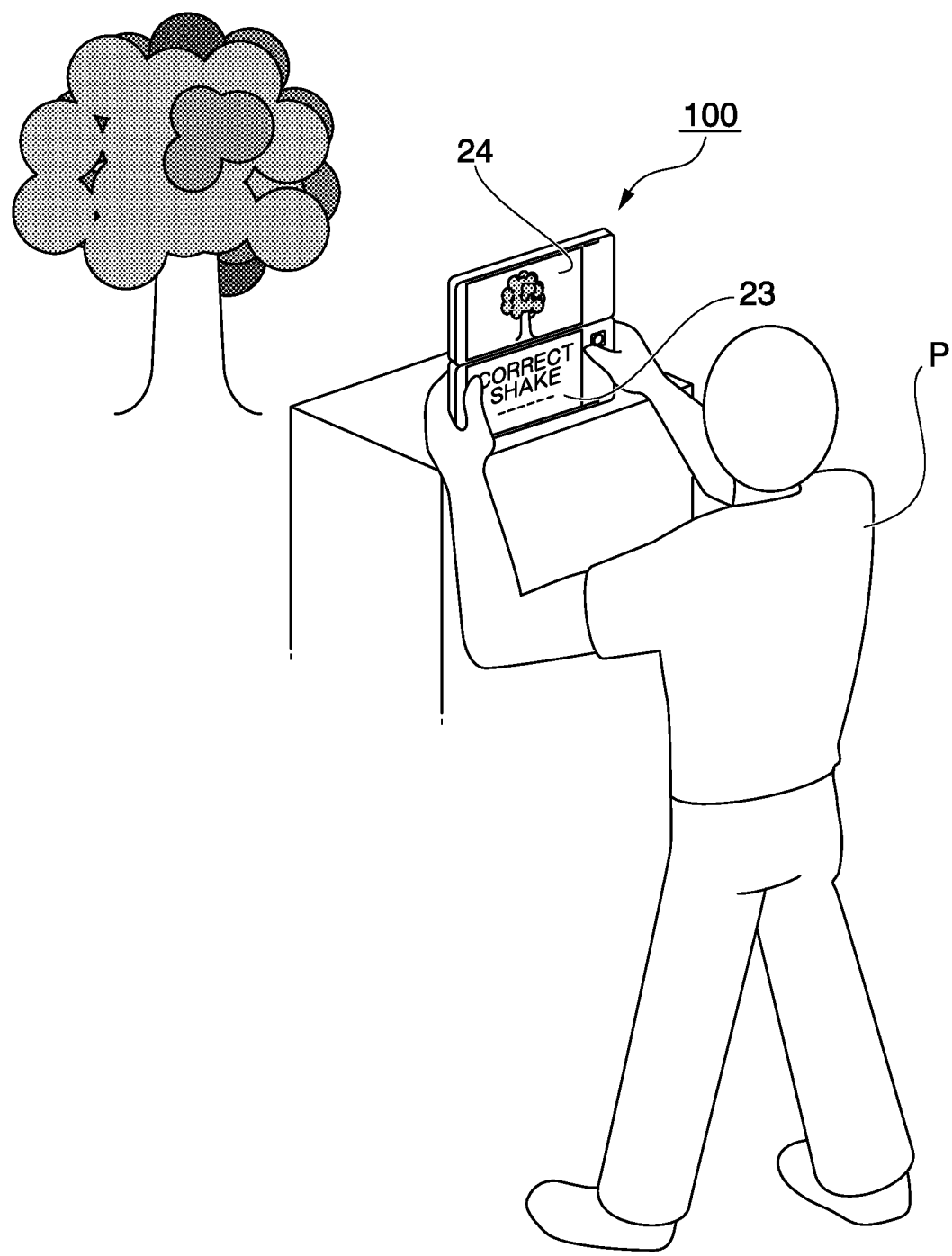
FIG. 8 is a diagram showing an example of a fourth image capturing method according to the smartphone 100.
Figure 9:
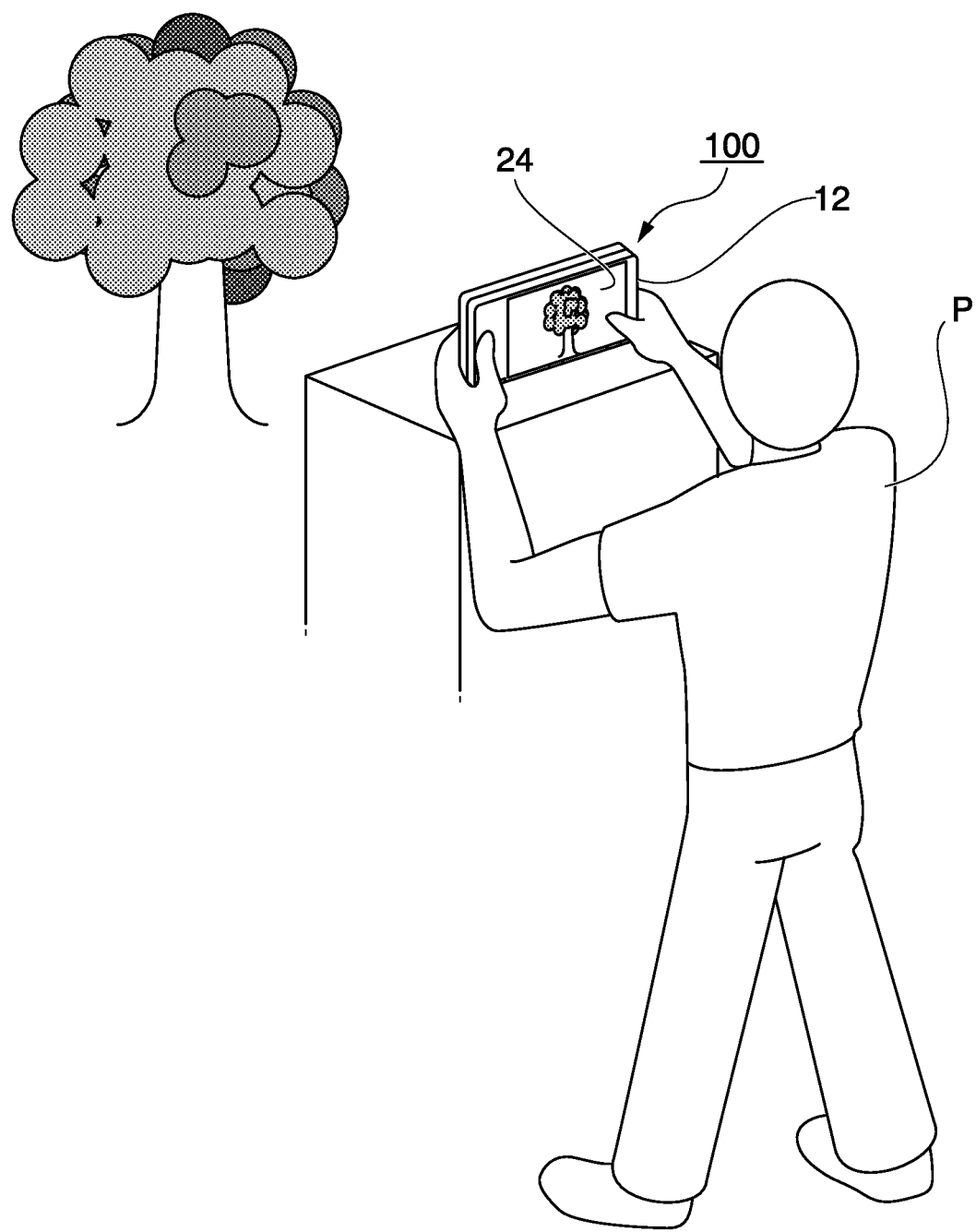
FIG. 9 is a diagram showing an example of a fifth image capturing method according to the smartphone 100.
Figure 10:
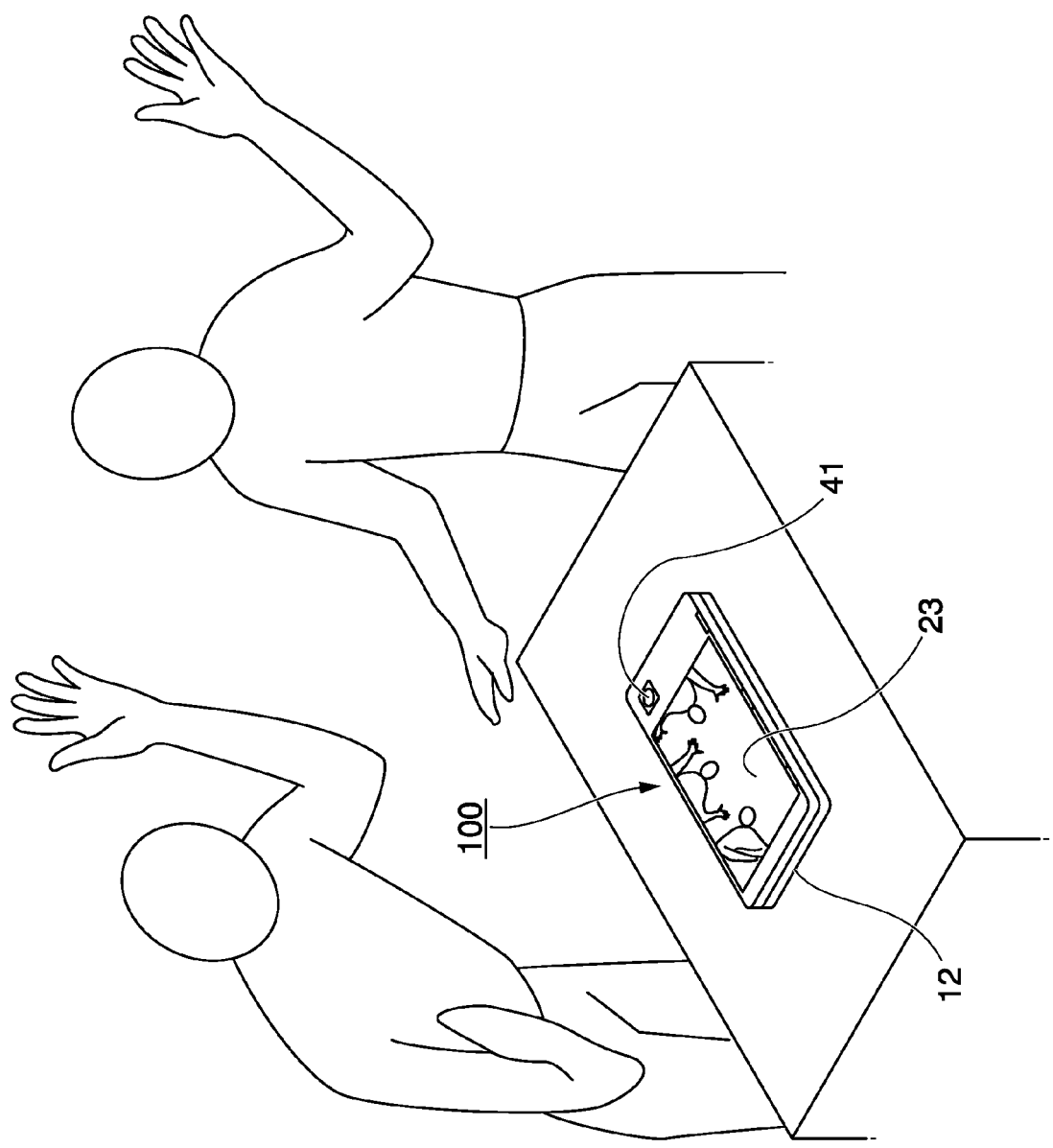
FIG. 10 is a diagram showing an example of a sixth image capturing method according to the smartphone 100.
Figure 11:
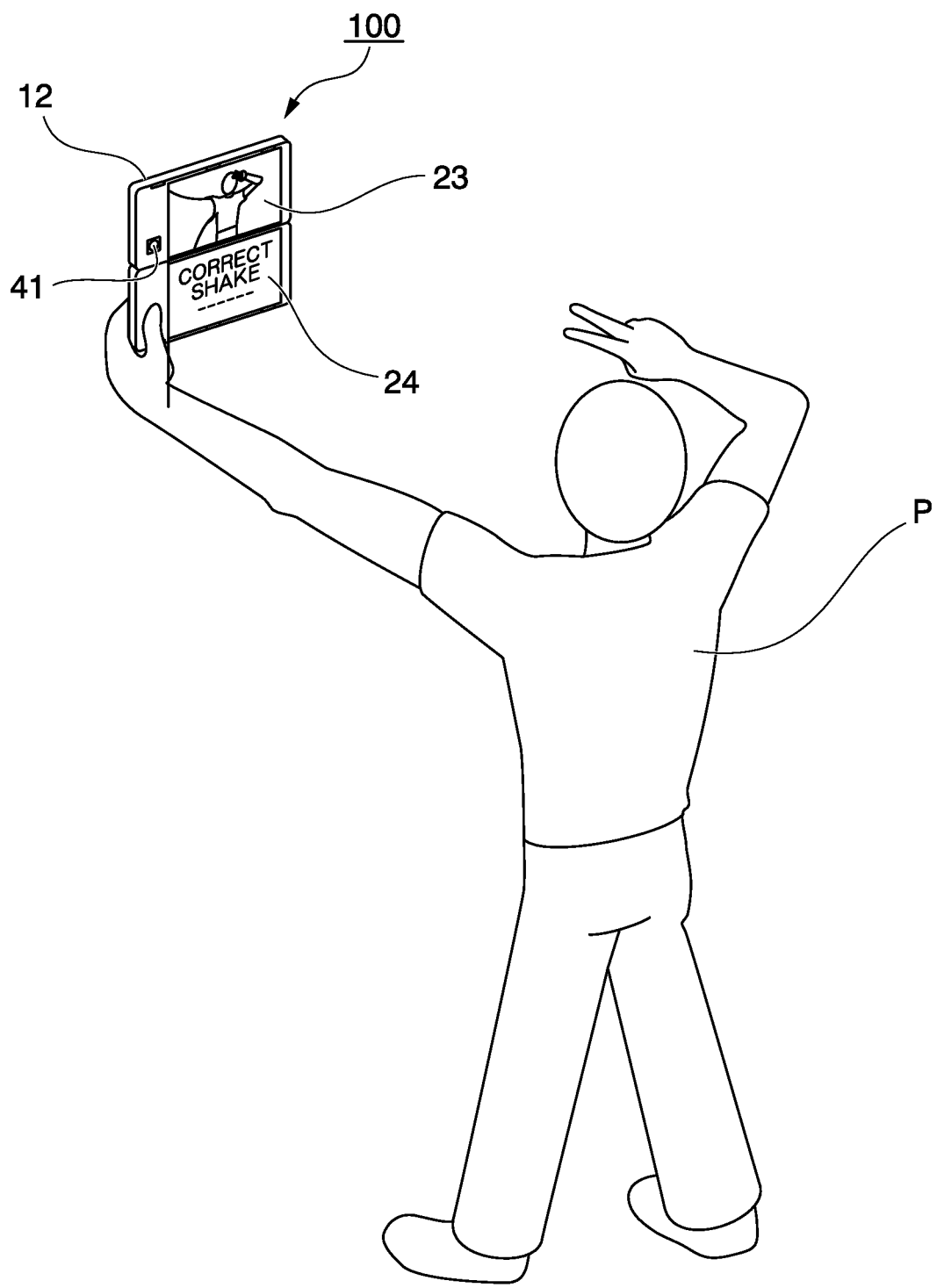
FIG. 11 is a diagram showing an example of a seventh image capturing method according to the smartphone 100.
Figure 12:
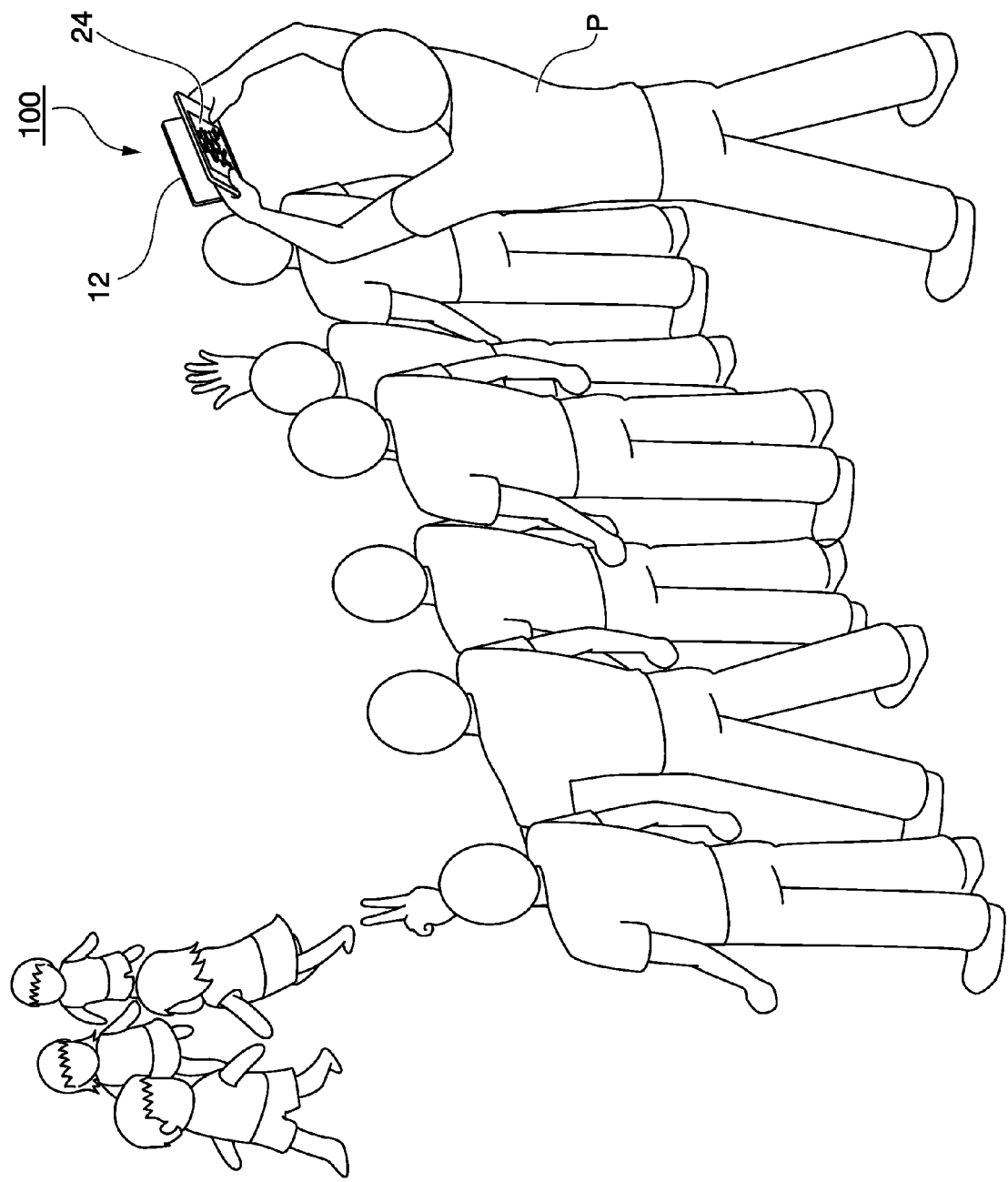
FIG. 12 is a diagram showing an example of an eighth image capturing method according to the smartphone 100.

FIG. 5 shows an example of a first image capturing method according to the smartphone 100. FIG. 6 shows an example of a second image capturing method according to the smartphone 100. FIG. 7 shows an example of a third image capturing method according to the smartphone 100. FIG. 8 shows an example of a fourth image capturing method according to the smartphone 100. FIG. 9 shows an example of a fifth image capturing method according to the smartphone 100. FIG. 10 shows an example of a sixth image capturing method according to the smartphone 100. FIG. 11 shows an example of a seventh image capturing method according to the smartphone 100. FIG. 12 shows an example of an eighth image capturing method according to the smartphone 100.

Figure 13:
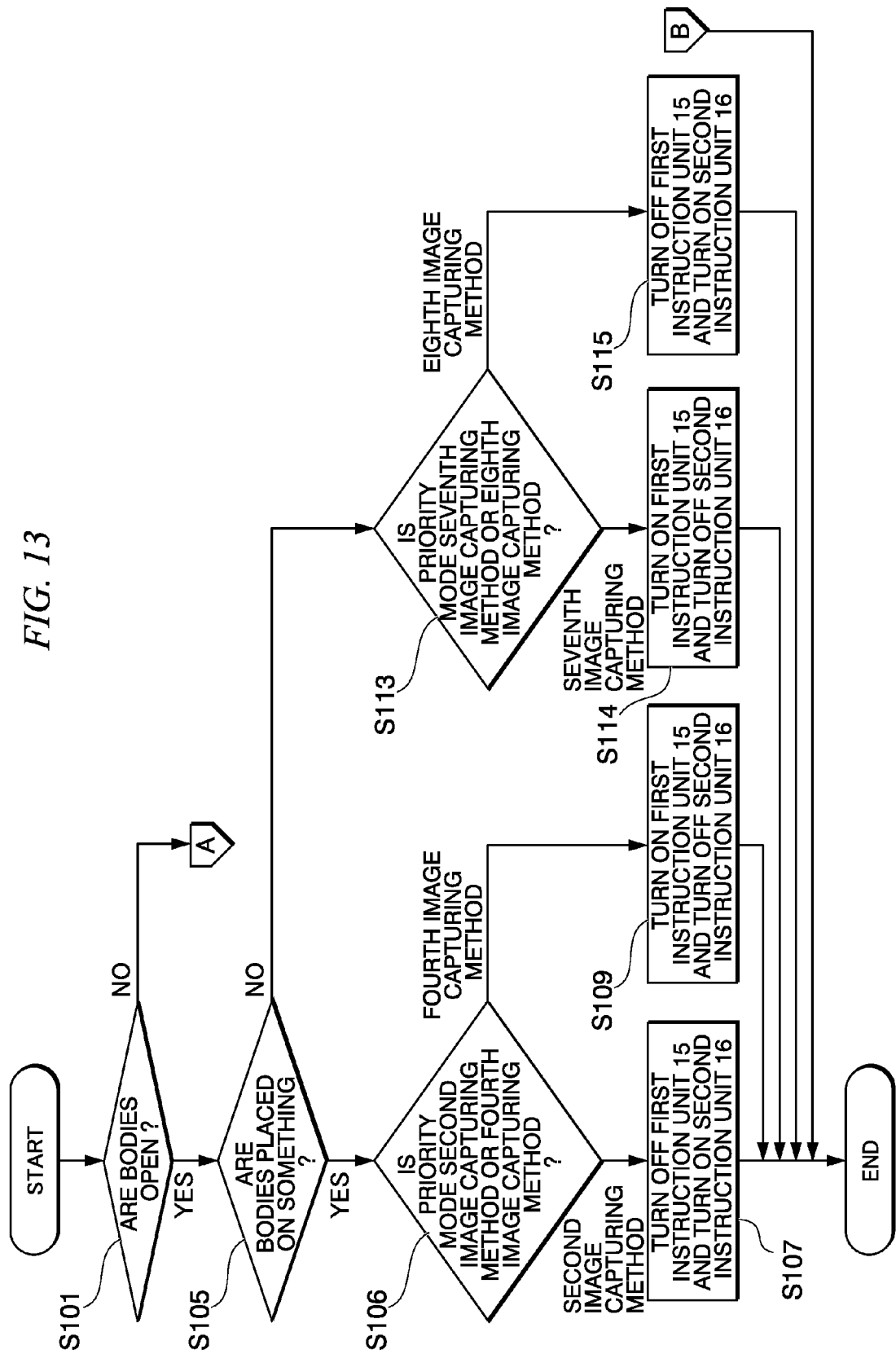
FIG. 13 is a flowchart utilized to explain the control operation of the smartphone 100.
Figure 14:
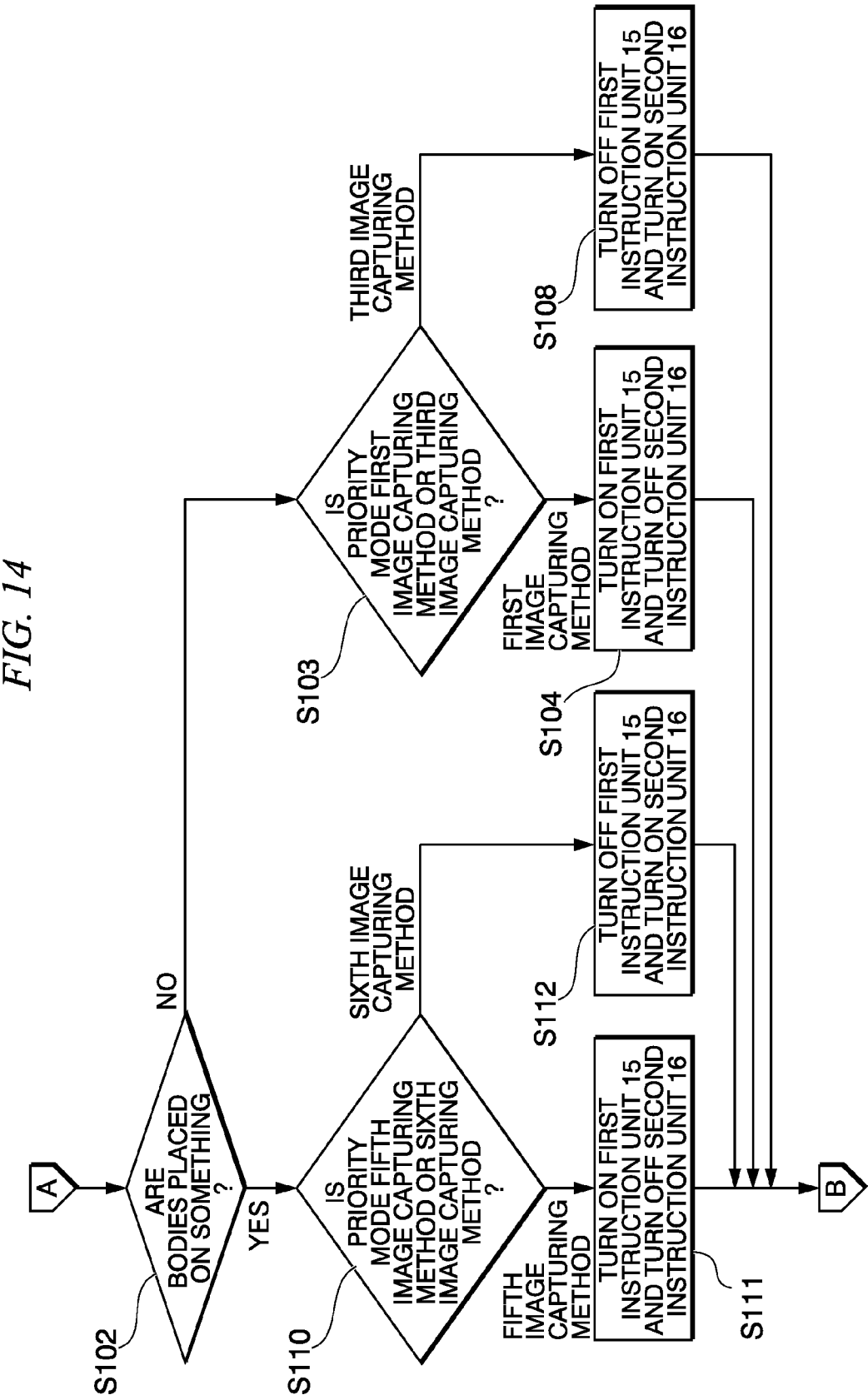
FIG. 14 is also a flowchart utilized to explain the control operation of the smartphone 100.

In addition, FIGS. 13 and 14 are flowcharts utilized to explain the control operation of the smartphone 100.

As shown in FIG. 5, in the first image capturing method, the user P holds the folded bodies 12 and 13 with both hands.

Since the two bodies 12 and 13 are closed, the angle sensor 32 detects a closed state of the two bodies 12 and 13. Additionally, the four bottom contact sensors 34, 35, 36, and 37 do not detect that the smartphone is placed on something.

That is, as shown in FIG. 13, in step S101, it is not determined by the control unit 26 that the bodies 12 and 13 form the open state. Therefore, the operation proceeds from step S101 to step S102, and step S102 is executed.

As shown in FIG. 14, in step S102, it is not determined by the control unit 26 that the bodies 12 and 13 are placed on something. Therefore, the operation proceeds from step S102 to step S103, and step S103 is executed.

If the condition that the instruction from the second instructing unit 16 is validated is currently ineffective, then in step S103, it is determined by the control unit 26 that the priority mode (i.e., the photographing mode to be selected) is the first image capturing method. Therefore, the operation proceeds from step S103 to step S104, and step S104 is executed.

In step S104, the control unit 26 turns on the first instruction unit 15 and turns off the second instruction unit 16.

Therefore, in the first image capturing method, in response to a shutter operation by the user P via the operation input unit 14, the smartphone 100 instructs hand-held landscape photographing by using the first camera 41. In this case, the smartphone 100 displays an image obtained by the imaging unit 17 on the second display unit 24 of the second body 13.

As shown in FIG. 6, in the second image capturing method, the two bodies 12 and 13 are opened (at the predetermined angle) and placed on a desk by the user P.

Since the two bodies 12 and 13 form the open state, the angle sensor 32 detects the open state of the two bodies 12 and 13. Additionally, the four bottom contact sensors 34, 35, 36, and 37 detect that the smartphone is placed on something.

That is, as shown in FIG. 13, in step S101, it is determined by the control unit 26 that the bodies 12 and 13 form the open state. Therefore, the operation proceeds from step S101 to step S105, and step S105 is executed.

In step S105, it is determined by the control unit 26 that the bodies 12 and 13 are placed on something. Therefore, the operation proceeds from step S105 to step S106, and step S106 is executed.

Then in step S106, since the two bodies 12 and 13 form the open state at the predetermined angle, it is determined by the control unit 26 that the priority mode is the second image capturing method. Therefore, the operation proceeds from step S106 to step S107, and step S107 is executed.

In step S107, the control unit 26 turns off the first instruction unit 15 and turns on the second instruction unit 16.

Therefore, in the second image capturing method, the smartphone 100 displays an image captured by the first camera 41 on the first display unit 23 to perform mirror-image display and instructs free-hand self-portrait photographing in a fixed state. Accordingly, the smartphone 100 instructs a shutter operation in response to an object's motion detected by the first camera 41.

As shown in FIG. 7, in the third image capturing method, the two bodies 12 and 13 are closed by the user P and held by one hand of the user.

Since the two bodies 12 and 13 are closed, the angle sensor 32 detects the closed state of the two bodies 12 and 13. Additionally, the four bottom contact sensors 34, 35, 36, and 37 do not detect that the smartphone is placed on something.

That is, as shown in FIG. 13, in step S101, it is not determined by the control unit 26 that the bodies 12 and 13 form the open state. Therefore, the operation proceeds from step S101 to step S102, and step S102 is executed.

As shown in FIG. 14, in step S102, it is not determined by the control unit 26 that the bodies 12 and 13 are placed on something. Therefore, the operation proceeds from step S102 to step S103, and step S103 is executed.

If the condition that the instruction from the second instructing unit 16 is validated is currently effective, then in step S103, it is determined by the control unit 26 that the priority mode is the third image capturing method. Therefore, the operation proceeds from step S103 to step S108, and step S108 is executed.

In step S108, the control unit 26 turns off the first instruction unit 15 and turns on the second instruction unit 16.

Therefore, in the third image capturing method, the smartphone 100 displays an image captured by the first camera 41 on the first display unit 23 to perform mirror-image display and instructs hand-held self-portrait photographing according to a shutter operation in response to an object's motion.

As shown in FIG. 8, in the fourth image capturing method, the bodies 12 and 13 are opened and placed (by the user P) on a desk with the first body 12 side down. In addition, the user P holds the bodies so that they face the user P.

Since the two bodies 12 and 13 are open, the angle sensor 32 detects an open state of the two bodies 12 and 13. Additionally, since the two bottom contact sensors 34 and 35 of the first body 12 contact the desk, they detect that the smartphone is placed on something.

That is, as shown in FIG. 13, in step S101, it is determined by the control unit 26 that the bodies 12 and 13 form the open state. Therefore, the operation proceeds from step S101 to step S105, and step S105 is executed.

In step S105, it is determined by the control unit 26 that the bodies 12 and 13 are placed on something. Therefore, the operation proceeds from step S105 to step S106, and step S106 is executed.

Then, in step S106, since the two bodies 12 and 13 do not form the open state at the predetermined angle, it is determined by the control unit 26 that the priority mode is the fourth image capturing method. Therefore, the operation proceeds from step S106 to step S109, and step S109 is executed.

In step S109, the control unit 26 turns on the first instruction unit 15 and turns off the second instruction unit 16.

Therefore, in the fourth image capturing method, the smartphone 100 instructs landscape photographing in a fixed state in response to a shutter operation by the user P by using the second camera 42. In this case, the smartphone 100 displays an image captured by the second camera 42 on the second display unit 24 and also display an operation screen on the first display unit 23.

As shown in FIG. 9, in the fifth image capturing method, the bodies 12 and 13 are closed and placed (by the user P) on a desk or the like.

Since the two bodies 12 and 13 are closed, the angle sensor 32 detects the closed state of the two bodies 12 and 13. Additionally, since the four bottom contact sensors 34, 35, 36, and 37 contact the desk, they detect that the smartphone is placed on something.

That is, as shown in FIG. 13, in step S101, it is not determined by the control unit 26 that the bodies 12 and 13 form the open state. Therefore, the operation proceeds from step S101 to step S102, and step S102 is executed.

As shown in FIG. 14, since the bodies 12 and 13 are placed on something in step S102, the operation proceeds from step S102 to step S110, and step S110 is executed.

If the condition that the instruction from the second instructing unit 16 is validated is currently ineffective, then in step S110, it is determined by the control unit 26 that the priority mode is the fifth image capturing method. Therefore, the operation proceeds from step S110 to step S111, and step S111 is executed.

In step S111, the control unit 26 turns on the first instruction unit 15 and turns off the second instruction unit 16.

Therefore, in the fifth image capturing method, the smartphone 100 instructs landscape photographing in a fixed state in response to a shutter operation by the user P by using the first camera 41. In this case, the smartphone 100 displays an image captured by the second camera 41 on the second display unit 24.

As shown in FIG. 10, in the sixth image capturing method, the bodies 12 and 13 are closed and placed on a desk or the like.

Since the two bodies 12 and 13 are closed, the angle sensor 32 detects the closed state of the two bodies 12 and 13. Additionally, since the two bottom contact sensors 36 and 37 contact the desk, they detect that the smartphone is placed on something.

That is, as shown in FIG. 13, in step S101, it is not determined by the control unit 26 that the bodies 12 and 13 form the open state. Therefore, the operation proceeds from step S101 to step S102, and step S102 is executed.

As shown in FIG. 14, since the bodies 12 and 13 are placed on something in step S102, the operation proceeds from step S102 to step S110, and step S110 is executed.

If the condition that the instruction from the second instructing unit 16 is validated is currently effective, then in step S110, it is determined by the control unit 26 that the priority mode is the sixth image capturing method. Therefore, the operation proceeds from step S110 to step S112, and step S112 is executed.

In step S112, the control unit 26 turns off the first instruction unit 15 and turns on the second instruction unit 16. Therefore, in the sixth image capturing method, the smartphone 100 instructs fisheye photographing while being placed on a desk or the like, by means of a self-timer shutter operation in response to an object's motion by using the first camera 41.

As shown in FIG. 11, in the seventh image capturing method, the two bodies 12 and 13 are opened and held by one hand.

The angle sensor 32 detects an open state of the two bodies 12 and 13. Additionally, the four bottom contact sensors 34, 35, 36, and 37 do not detect that the smartphone is placed on something.

That is, as shown in FIG. 13, in step S101, it is determined by the control unit 26 that the bodies 12 and 13 form the open state. Therefore, the operation proceeds from step S101 to step S105, and step S105 is executed.

In step S105, since the bodies 12 and 13 are not placed on something in step S105, the operation proceeds from step S105 to step S113, and step S113 is executed.

Then, in step S113, since the two bodies 12 and 13 do not form the open state at the predetermined angle, it is determined by the control unit 26 that the priority mode is the seventh image capturing method. Therefore, the operation proceeds from step S113 to step S114, and step S114 is executed.

In step S114, the control unit 26 turns on the first instruction unit 15 and turns off the second instruction unit 16.

Therefore, in the seventh image capturing method, the smartphone 100 instructs one-hand-held self-portrait photographing by utilizing the first camera 41 in response to a shutter operation by the user P. In this case, the smartphone 100 displays an image captured by the first camera 41 on the first display unit 23 to perform mirror-image display and also displays an operation screen on the second display unit 24.

As shown in FIG. 12, in the eighth image capturing method, the two bodies 12 and 13 are opened and held by both hands.

The angle sensor 32 detects an open state of the two bodies 12 and 13. Additionally, the four bottom contact sensors 34, 35, 36, and 37 do not detect that the smartphone is placed on something.

That is, as shown in FIG. 13, in step S101, it is determined by the control unit 26 that the bodies 12 and 13 form the open state. Therefore, the operation proceeds from step S101 to step S105, and step S105 is executed.

In step S105, since the bodies 12 and 13 are not placed on something in step S105, the operation proceeds from step S105 to step S113, and step S113 is executed.

Then, in step S113, since the two bodies 12 and 13 form the open state at the predetermined angle, it is determined by the control unit 26 that the priority mode is the eighth image capturing method. Therefore, the operation proceeds from step S113 to step S115, and step S115 is executed.

In step S115, the control unit 26 turns off the first instruction unit 15 and turns on the second instruction unit 16.

Therefore, in the eighth image capturing method, the smartphone 100 instructs hand-held person photographing by means of a shutter operation in response to an object's motion. In this case, the smartphone 100 displays an image captured by the first camera 41 on the second display unit 24. This eighth image capturing method is preferable when, for example, the object is photographed in a crowd over the heads of the crowd.

As described above, according to the smartphone 100 of the present embodiment, the control unit 26 controls, based on the state of the bodies 12 and 13, whether or not the instruction from the first instructing unit 15 is invalidated and whether or not the instruction from the second instructing unit 16 is invalidated. Therefore, according to the smartphone 100, an appropriate control can be performed without a complex operation by the user P.

Again, according to the smartphone 100 of the present embodiment, since the control unit 26 controls whether or not the instruction from the second instructing unit 16 is invalidated based on the open or closed state of the bodies 12 and 13, an instruction corresponding to the requirement set by the user P can be performed.

Also according to the smartphone 100 of the present embodiment, the control unit 26 performs a control to validate the instruction from the second instructing unit 16 when the bodies 12 and 13 form the open state at the predetermined angle. Therefore, an instruction corresponding to the requirement set by the user P can be performed.

In addition, according to the smartphone 100 of the present embodiment, the control unit 26 performs a control to validate the instruction from the second instructing unit 16 if, in the open state of the bodies 12 and 13 at the predetermined angle, a predetermined bottom contact state of the bodies 12 and 13 is detected by the bottom contact detection unit 22.

Therefore, a complex operation by the user P can be reliably prevented according to the smartphone 100.

Furthermore, according to the smartphone 100 of the present embodiment, the control unit 26 performs a control to invalidate the instruction from the second instructing unit 16 when the bodies 12 and 13 are in the closed state. Therefore, an instruction corresponding to the requirement set by the user P can be performed.

Also according to the smartphone 100 of the present embodiment, when the control unit 26 performs a control to validate the instruction from the second instructing unit 16 based on an instruction input by the user or the like, the control unit 26 performs a control to invalidate the instruction from the first instructing unit 15. Therefore, an instruction corresponding to the requirement set by the user P can be performed.

Again, according to the smartphone 100 of the present embodiment, when a predetermined object's motion is detected by the motion detection unit 18, the second instruction unit 16 instructs execution of the imaging by using the imaging unit 17. Therefore, it is possible no to miss the shutter chance.

Additionally, according to the smartphone 100 of the present embodiment, when it is determined by means of the clocking unit 19 that a predetermined time has elapsed, the second instruction unit 16 instructs the execution of the imaging by using the imaging unit 17. Therefore, it is possible to reliably perform the self-timer photographing.

In addition, according to the smartphone 100 of the present embodiment, when a predetermined facial expression of the object is detected by the facial expression detection unit 20, the second instruction unit 16 instructs the execution of the imaging by using the imaging unit 17. Therefore, it is possible to reliably perform the gesture photographing.

Furthermore, according to the smartphone 100 of the present embodiment, when a predetermined object is identified by the object identifying unit 21, the second instruction unit 16 instructs the execution of the imaging by using the imaging unit 17. Therefore, it is possible to photograph a specifically selected object.

Additionally, according to the smartphone 100 of the present embodiment, the display units 23 and 24 are respectively provided on the openable and closable two bodies 12 and 13 where the display units are arranged on the outer surfaces in the closed state of the bodies. As the imaging unit 17, one is provided on one of the above outer surfaces, and another one is provided on one of the inner surfaces in the closed state of the bodies. Therefore, the smartphone 100 provides the user P with a novel handling method.

Also according to the smartphone 100 of the present embodiment, the display control unit 25 performs a control to display each image obtained by the imaging unit 17 on the display unit 23 or 24 in a mirror-image manner. Therefore, the self-portrait photographing can be easily performed.

Furthermore, according to the smartphone 100 of the present embodiment, when an operation to designate the display unit 23 or 24 is input by utilizing the operation input unit 14, the display control unit 25 performs a switching control for the display of each image obtained by the imaging unit 17 on the display unit 23 or 24. Therefore, the smartphone 100 can perform an instruction corresponding to the requirement set by the user P.

In accordance with the imaging method according to the present embodiment which employs the smartphone 100, it is possible to prevent a complex operation of the user P and perform an appropriate control.

In accordance with the program according to the present embodiment, it is possible to prevent a complex operation of the user P and perform an appropriate control.

The relevant imaging device, imaging method, and program are not limited to the above-described embodiment and appropriate variation, improvement, or the like may be performed.

Figure 15:
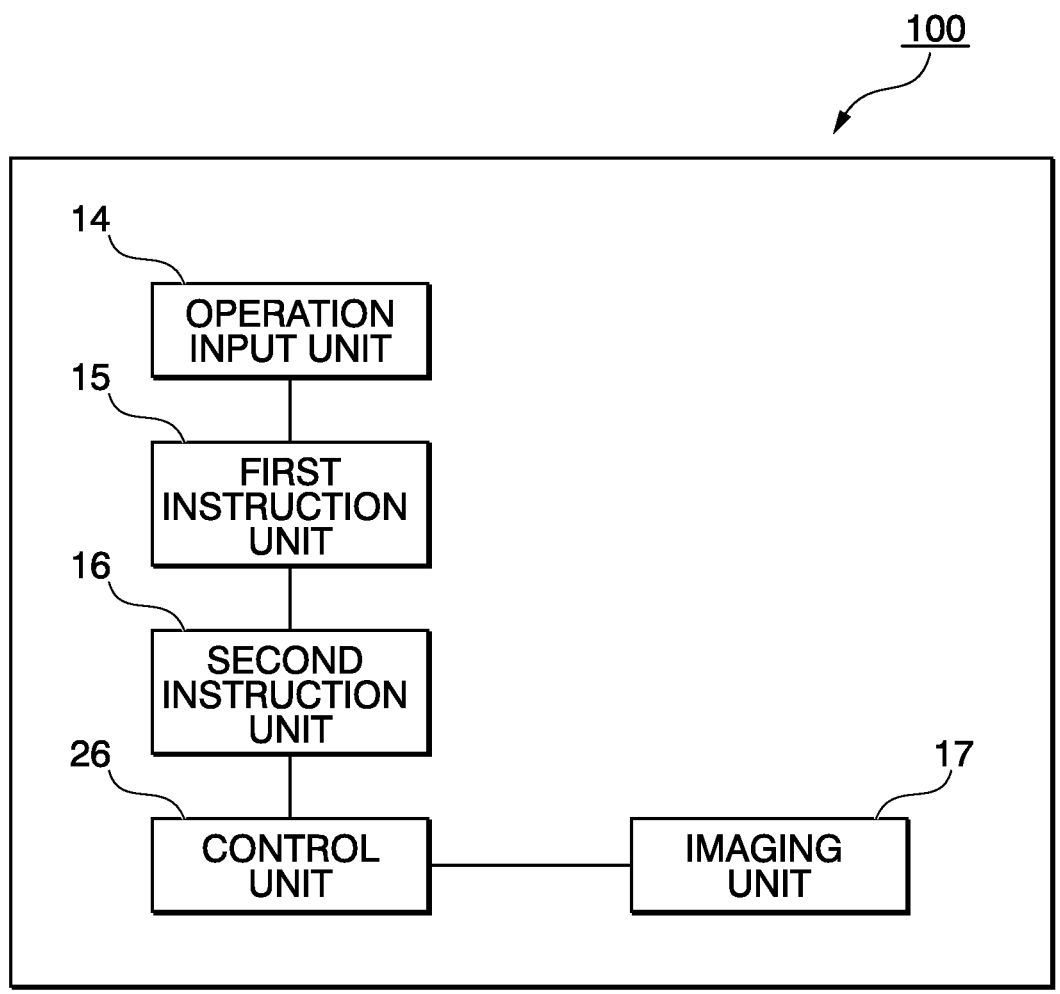
FIG. 15 is a diagram showing an example of the minimum configuration for the smartphone 100.

FIG. 15 shows an example of the minimum configuration for the smartphone 100. Here, the smartphone 100 has at least the imaging unit 17, the operation input unit 14, the first instruction unit 15, the second instruction unit 16, and the controller 26.

Priority is claimed on Japanese Patent Application No. 2013-043821, filed Mar. 6, 2013, the contents of which are incorporated herein by reference.

INDUSTRIAL APPLICABILITY

In accordance with the present invention, it is possible to prevent a complex operation of the user and perform an appropriate control.

REFERENCE SYMBOLS 12 first body
13 second body 14 operation input unit
15 first instruction unit
16 second instruction unit
17 imaging unit
18 motion detection unit
19 clocking unit
20 facial expression detection unit
21 object identifying unit
22 bottom contact detection unit
23 first display unit
24 second display unit
25 display control unit
26 control unit
100 smartphone

What is claimed is:

1. An imaging device comprising:
a case body;
an imaging unit implemented as an imaging device including hardware and that is provided at the case body and images an object;
an operation input unit implemented as an input device including hardware and that is utilized to input an imaging operation;
a first instruction unit implemented by a processor executing code stored on a non-transitory medium and that instructs the imaging unit to execute the imaging when the imaging operation is input via the operation input unit;
a second instruction unit implemented by the processor executing the code and that instructs, based on a trigger other than the imaging operation, the imaging unit to execute the imaging; and
a control unit implemented by the processor executing the code and that invalidates, based on a state of the case body, one of the imaging unit executing the imaging in response to the instruction by the first instruction unit, and the imaging unit executing the imaging in response to the instruction by the second instruction unit, wherein:
the case body has at least two bodies which are openable and closable;
the control unit controls whether or not to invalidate the imaging unit executing the imaging in response to the instruction by the second instruction unit, based on an open or closed state of the bodies as the state of the case body;
when the case body is in an open state at a predetermined angle as the state of the case body, the control unit validates the imaging unit executing the imaging in response to the instruction by the second instruction unit;
the imaging device further comprises a bottom contact detection unit implemented as a sensor including hardware and that detects a state of the imaging device, in which a bottom of the imaging device contacts something;
and when the case body is in the open state at the predetermined angle and a predetermined bottom contact state is detected by the bottom contact detection unit, the control unit validates the imaging unit executing the imaging in response to the instruction by the second instruction unit.

2. The imaging device in accordance with claim 1, wherein:
when the case body is in a closed state as the state of the case body, the control unit invalidates the imaging unit executing the imaging in response to the instruction by the second instruction unit.

3. The imaging device in accordance with claim 1, wherein:
when the control unit validates the imaging unit executing the imaging in response to the instruction by the second instruction unit, the control unit invalidates the imaging unit executing the imaging in response to the instruction by the first instruction unit.

4. The imaging device in accordance with claim 1, further comprising:
a motion detection unit implemented as a motion detector including hardware and that detects a motion of the object,
wherein when a predetermined motion of the object is detected by the motion detection unit, the second instruction unit instructs the imaging unit to execute the imaging.

5. The imaging device in accordance with claim 1, further comprising:
a clocking unit implemented as a clock device including hardware and that measures a time,
wherein when it is detected by the clocking unit that a predetermined time has elapsed, the second instruction unit instructs the imaging unit to execute the imaging.

6. The imaging device in accordance with claim 1, further comprising:
a facial expression detection unit implemented as a detector including hardware and that detects a facial expression of the object,
wherein when a predetermined facial expression of the object is detected by the facial expression detection unit, the second instruction unit instructs the imaging unit to execute the imaging.

7. The imaging device in accordance with claim 1, further comprising:
an object identifying unit implemented by the processor executing the code and that identifies the object,
wherein when the object is identified as a predetermined object by the object identifying unit, the second instruction unit instructs the imaging unit to execute the imaging.

8. The imaging device in accordance with, claim 1, wherein:
the case body has at least two bodies which are openable and closable;
each of the two bodies has a display unit implemented as a display device including hardware, where the display unit is arranged on an outer surface of the corresponding body in a closed state of the case body; and
the imaging unit is arranged in a manner such that one imaging unit is provided on one of the outer surfaces of the bodies and another imaging unit is provided on one of inner surfaces in the closed state.

9. The imaging device in accordance with claim 8, further comprising:
a display control unit implemented by the processor executing the code and that performs a control to display an image obtained by the imaging unit on the display unit,
wherein the display control unit performs a control to display the image obtained by the imaging unit as an mirror image on the display unit.

10. The imaging device in accordance with claim 9, wherein:
when an operation to designate one of the display units is input via the operation input unit, the display control unit performs a switching control for the display of the image obtained by the imaging unit on one of the display unit.

11. An imaging method comprising:
a first instruction step that instructs an imaging unit to execute imaging when an imaging operation is input via an operation input unit;
a second instruction step that instructs, based on a trigger other than the imaging operation, the imaging unit to execute the imaging; and
a control step that invalidates, based on a state of a case body, one of the imaging unit executing the imaging in response to the instruction by the first instruction step, and the imaging unit executing the imaging in response to the instruction by the second instruction step, wherein:
the case body has at least two bodies which are openable and closable;
the control step controls whether or not to invalidate the imaging unit executing the imaging in response to the instruction by the second instruction unit, based on an open or closed state of the bodies as the state of the case body;
when the case body is in an open state at a predetermined angle as the state of the case body, the control step validates the imaging unit executing the imaging in response to the instruction by the second instruction unit;
the imaging method further comprises a bottom contact detection step that detects a state of the imaging device, in which a bottom of the imaging device contacts something;
and when the case body is in the open state at the predetermined angle and a predetermined bottom contact state is detected by the bottom contact detection step, the control step validates the imaging unit executing the imaging in response to the instruction by the second instruction unit.

12. A non-transitory computer-readable storage medium which stores a program utilized to make a computer function as:
a first instruction unit that instructs an imaging unit to execute imaging when an imaging operation is input via an operation input unit;
a second instruction unit that instructs, based on a trigger other than the imaging operation, the imaging unit to execute the imaging; and
a control unit that invalidates, based on a state of a case body, one of the imaging unit executing the imaging in response to the instruction by the first instruction unit, and the imaging unit executing the imaging in response to the instruction by the second instruction unit, wherein:
the case body has at least two bodies which are openable and closable;
the control unit controls whether or not to invalidate the imaging unit executing the imaging in response to the instruction by the second instruction unit, based on an open or closed state of the bodies as the state of the case body;
when the case body is in an open state at a predetermined angle as the state of the case body, the control unit validates the imaging unit executing the imaging in response to the instruction by the second instruction unit;
the program is further utilized to make the computer to function as a bottom contact detection unit that detects a state of the imaging device, in which a bottom of the imaging device contacts something;
and when the case body is in the open state at the predetermined angle and a predetermined bottom contact state is detected by the bottom contact detection unit, the control unit validates the imaging unit executing the imaging in response to the instruction by the second instruction unit.

\* \* \* \* \*